(12) United States Patent
Novak

(10) Patent No.: US 6,863,970 B2
(45) Date of Patent: Mar. 8, 2005

(54) FASTENER RETENTION FOAM SHEET AND ASSOCIATED METHOD

(75) Inventor: Herman Novak, Brentwood, TN (US)

(73) Assignee: Penske Composites, Mt. Juliet, TN (US)

( * ) Notice: Subject to any disclaimer, the term of this patent is extended or adjusted under 35 U.S.C. 154(b) by 0 days.

(21) Appl. No.: 10/162,215

(22) Filed: Jun. 4, 2002

(65) Prior Publication Data

US 2003/0134103 A1 Jul. 17, 2003

Related U.S. Application Data

(60) Provisional application No. 60/349,439, filed on Jan. 17, 2002.

(51) Int. Cl.[7] .............................. B32B 5/14; B32B 3/06
(52) U.S. Cl. ........................ 428/309.9; 428/74; 428/76; 428/306.6; 428/308.4; 428/99; 52/309.4; 52/309.7; 52/309.8
(58) Field of Search ........................... 428/317.9, 319.3, 428/319.1, 99, 74, 309.9, 306.6, 308.4; 52/309.4, 309.7, 309.8

(56) References Cited

U.S. PATENT DOCUMENTS

| 2,558,632 | A | | 6/1951 | Trozmuller | |
|---|---|---|---|---|---|
| 3,309,451 | A | | 3/1967 | Holtzman | |
| 3,591,444 | A | | 7/1971 | Hoppe | |
| 3,934,064 | A | | 1/1976 | Lowthian | |
| 3,989,781 | A | | 11/1976 | Chant | |
| 4,117,947 | A | * | 10/1978 | Androulakis | 220/560.08 |
| 4,130,614 | A | | 12/1978 | Saidla | |
| 4,155,482 | A | * | 5/1979 | Swaney | 220/560.15 |
| 4,238,266 | A | * | 12/1980 | Steinberg et al. | 156/243 |
| 4,250,136 | A | | 2/1981 | Rex | |
| 4,283,457 | A | | 8/1981 | Kolsky et al. | |
| 4,298,556 | A | | 11/1981 | Rutsch et al. | |

(List continued on next page.)

Primary Examiner—Terrel Morris
Assistant Examiner—Hai Vo
(74) Attorney, Agent, or Firm—Bracewell&Patterson

(57) ABSTRACT

A combination fastener and foam sheet having enhanced fastener retention and methods of forming a foam sheet are provided so that the fastener is not easily removed from the foam sheet when an outward force is applied thereto. The combination preferably includes a foam sheet including a fibrous material and urethane foam material abuttingly contacting and substantially surrounding the fibrous material so that the fibrous material is substantially contained within and retained by the urethane foam material. The combination also preferably includes a fastener having threaded portions positioned within the foam sheet so that the threaded portions are retained in the foam sheet and are not easily removed when an outward force is applied thereto. The foam sheet preferably also has a strengthening material such as glass also substantially surrounded by the urethane foam.

30 Claims, 9 Drawing Sheets

U.S. PATENT DOCUMENTS

| | | | | |
|---|---|---|---|---|
| 4,372,900 A | | 2/1983 | Doerfling | |
| 4,474,635 A | | 10/1984 | Adams | |
| 4,476,183 A | | 10/1984 | Holtrop et al. | |
| 4,556,529 A | | 12/1985 | Muser et al. | |
| 4,636,425 A | | 1/1987 | Johnson et al. | |
| 4,891,176 A | | 1/1990 | Drysdale et al. | |
| 4,952,358 A | | 8/1990 | Okina et al. | |
| 5,188,347 A | * | 2/1993 | Hunnell et al. | 269/258 |
| 5,298,214 A | | 3/1994 | Morrow et al. | |
| 5,308,570 A | | 5/1994 | Hara et al. | |
| 5,346,171 A | | 9/1994 | Kephart | |
| 5,391,344 A | | 2/1995 | Rains et al. | |
| 5,447,675 A | | 9/1995 | Kephart | |
| 5,534,207 A | | 7/1996 | Burrus | |
| 5,536,556 A | | 7/1996 | Juriga | |
| 5,543,094 A | | 8/1996 | Hara et al. | |
| 5,558,931 A | * | 9/1996 | Biggs et al. | 428/218 |
| 5,585,122 A | | 12/1996 | Drum et al. | |
| 5,589,260 A | | 12/1996 | Ben Zvi et al. | |
| 5,672,309 A | | 9/1997 | Masui et al. | |
| 5,681,519 A | | 10/1997 | Kelman | |
| 5,709,933 A | * | 1/1998 | Evans | 428/297.4 |
| 5,792,552 A | * | 8/1998 | Langkamp et al. | 428/309.9 |
| 5,804,312 A | | 9/1998 | Noma et al. | |
| 5,807,513 A | | 9/1998 | Gebreselassie et al. | |
| 5,827,460 A | | 10/1998 | Brentrup et al. | |
| 5,875,599 A | * | 3/1999 | McGrath et al. | 52/586.2 |
| 5,912,195 A | | 6/1999 | Walla et al. | |
| 6,004,492 A | | 12/1999 | Lewit et al. | |
| 6,013,213 A | | 1/2000 | Lewit et al. | |
| 6,036,902 A | | 3/2000 | Wang | |
| 6,110,580 A | | 8/2000 | Gebreselassie et al. | |
| 6,132,655 A | | 10/2000 | Ray | |
| 6,171,419 B1 | | 1/2001 | Heiman et al. | |
| 6,197,242 B1 | | 3/2001 | Parks et al. | |
| 6,204,209 B1 | | 3/2001 | Rozek et al. | |

* cited by examiner

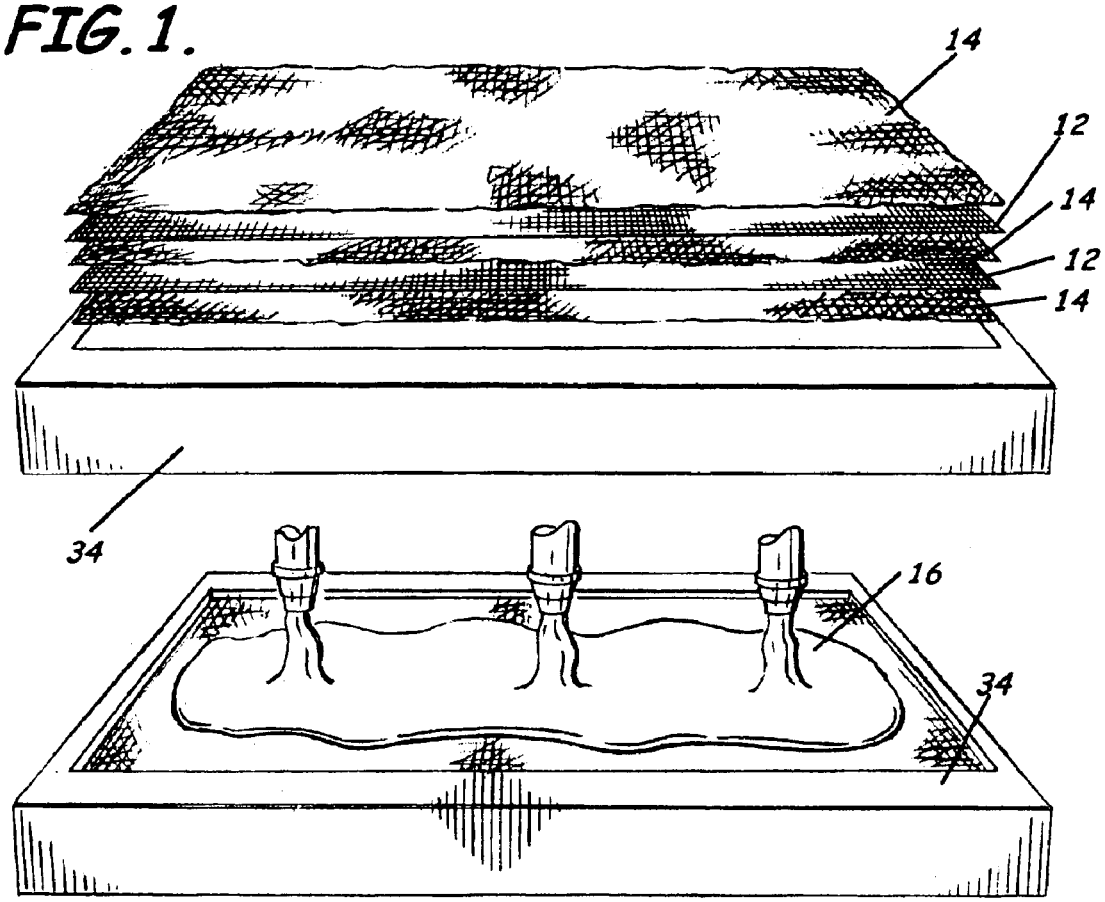

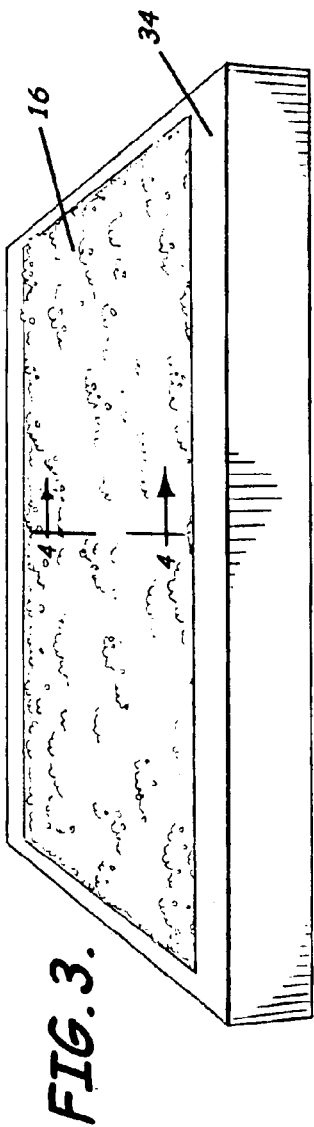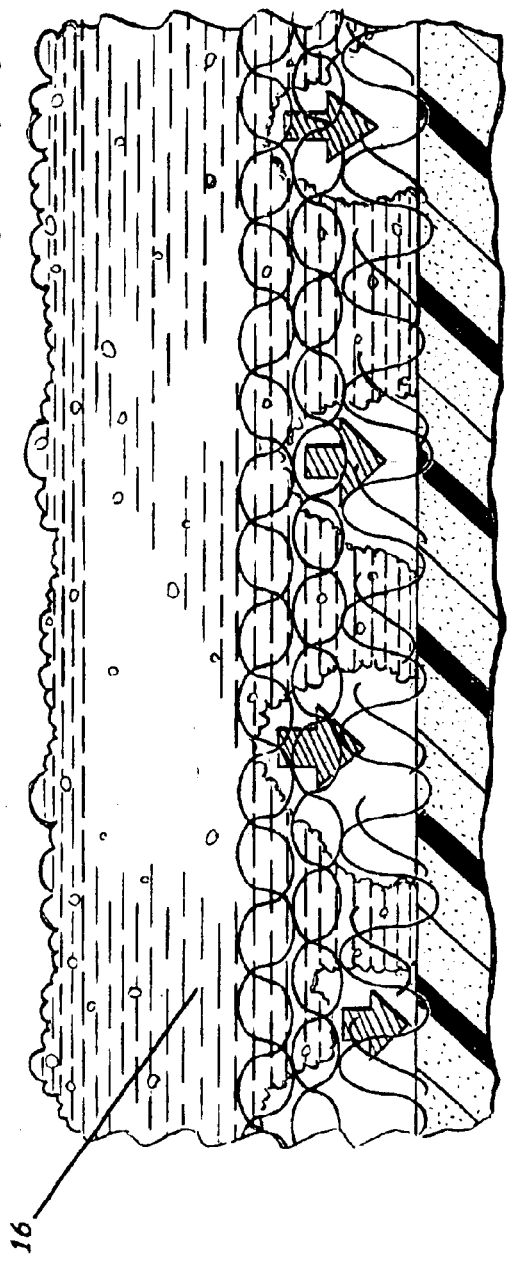

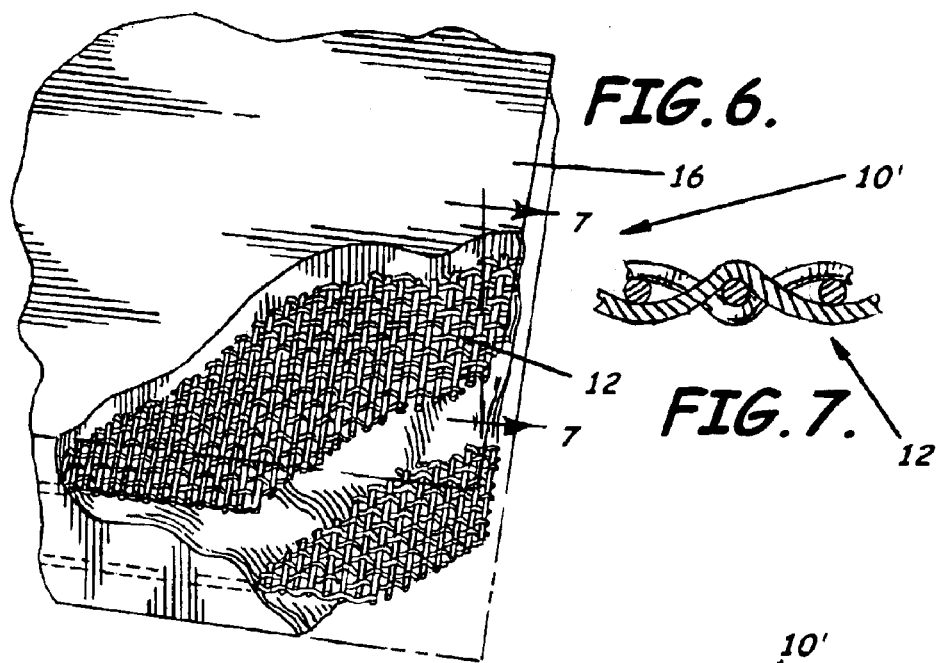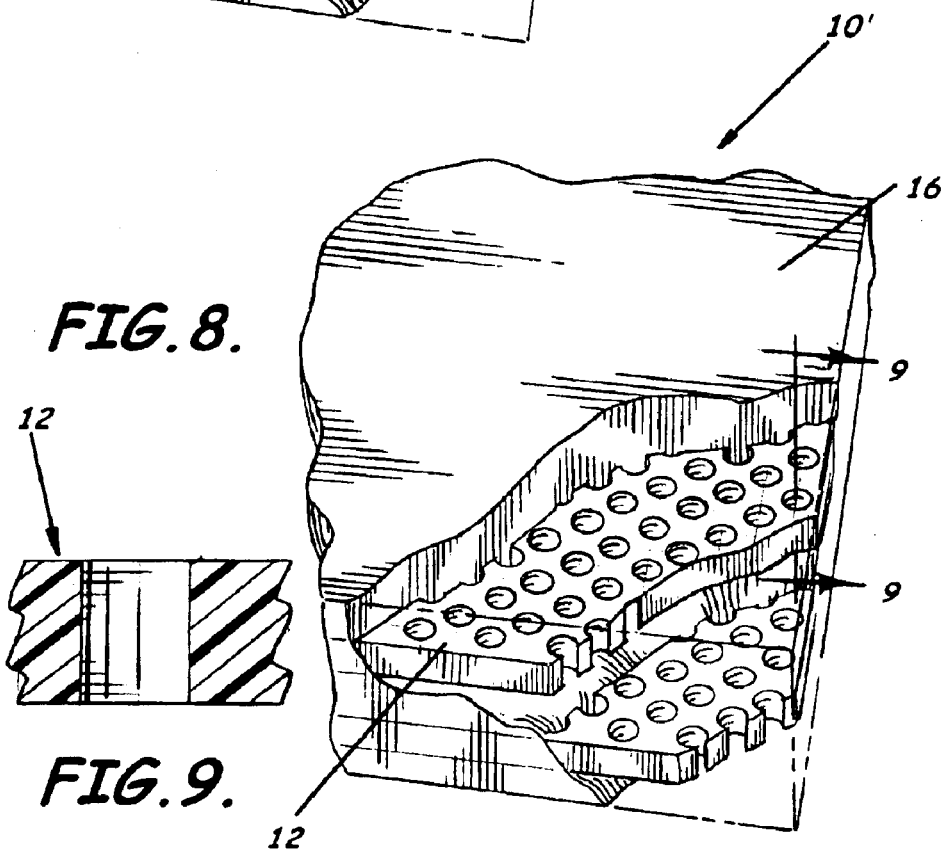

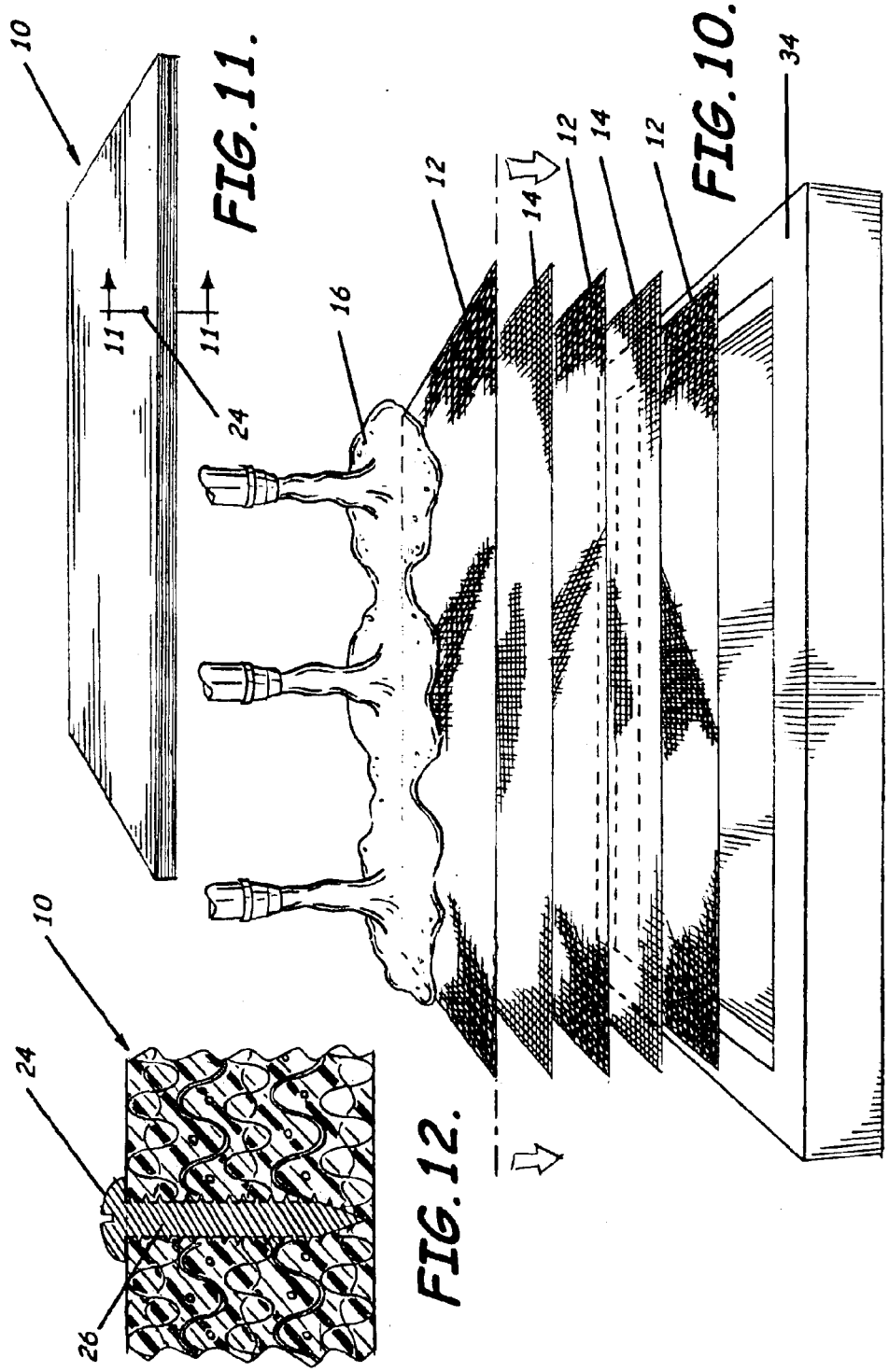

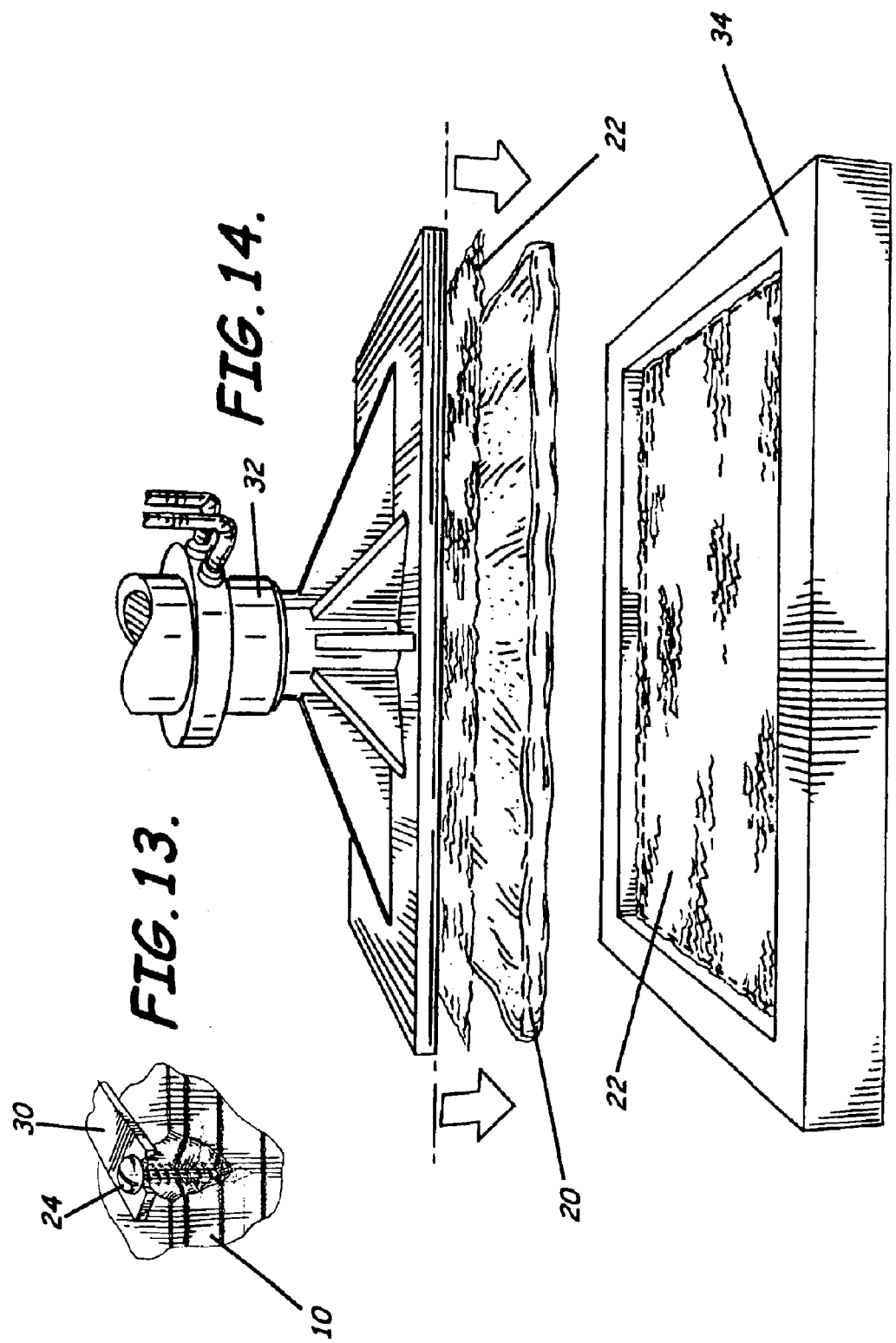

FASTENER RETENTION FOAM SHEET AND ASSOCIATED METHOD

This application claims the benefit of U.S. Provisional Patent Application Ser. No. 60/349,439, filed on Jan. 17, 2002, which hereby is incorporated by reference in its entity.

FIELD OF THE INVENTION

This invention relates to the sheet products and methods and, more particularly, to a plastic foam sheet and methods of forming the same.

BACKGROUND OF THE INVENTION

In the sheet industry, various types of plastic foam sheets or composites are often used in various industries such as boating, automotive, airplane, luggage, seating, helmets, construction, acoustical applications, and other custom use applications. For example, in the automotive and airline industries plastic foam sheets having fibrous non-woven batt content have been used for vehicle headliners, interior door panels, and for decorative sound absorbing panels such as shown in U.S. Pat. No. 6,204,209 by Rozek et al. titled "Acoustical Composite Headliner;" U.S. Pat. No. 6,171,419 by Heiman et al. titled "Apparatus And Method For Forming An Interior Panel For A Vehicle;" U.S. Pat. No. 5,827,460 by Brentrup et al. titled "Production Of Fiber Composite;" U.S. Pat. No. 5,804,312 by Noma et al. titled "Processable Sheet With Excellent Rigidity And Process For Producing The Same;" U.S. Pat. No. 5,681,519 by Kelman titled "Method Of Squeeze Molding A Foam Cored Article;" and U.S. Pat. No. 5,536,556 by Juriga titled "Insulating Sheet." In these examples, the batt material is cotton, fiberglass, synthetic thermoplastic fiber material such as nylon, or a combination of natural and synthetic fibers. The batt material is used as a reinforcement to help the sheet to retain its shape, e.g., rigidity, during molding or to enhance durability in high temperature applications and to enhance sound attenuation or acoustic absorption.

Also, plastic panels or sheets and other materials have been developed from recycled materials over the years. Examples of such recycled products and methods of recycling plastics and other materials can be seen in U.S. Pat. Nos. 5,447,675 and 5,346,171 each by Kehphart and each titled "Method And Apparatus For Forming Plastic Panels From Recycled Plastic Chips;" U.S. Pat. No. 5,589,260 by Ben Zvi et al. titled "Method And Apparatus For Producing Plastic Products;" and U.S. Pat. No. 5,585,122 by Drum et al. titled "Apparatus For Converting Raw Materials Into A Molded End Product."

Plastic foam sheets, and particularly high strength plastic foam sheets, however, have conventionally had quite a bit of difficulty retaining fasteners such as screws, rivets, threaded eyelets, or hooks. The fasteners are often formed of a metal material and the smooth surfaces between the metal material and the plastic material allows the fastener to slip, slide, or detach from the plastic material.

SUMMARY OF THE INVENTION

In view of the foregoing, the present invention advantageously provides a fastener retention foam sheet and associated methods that substantially enhance the fastener retention properties of a foam sheet. The present invention also advantageously provides a fastener retention foam sheet and associated methods that readily allow sheets to be formed for use in boats, trucking floors, cabinets, ice arenas, agricultural building floors, reusable concrete forms, and many other applications where high strength and fastener retention can be important. The present invention additionally advantageously provides a fastener foam sheet and associated methods that are cost effective to produce and relatively simple to manufacture.

More particularly, the present invention advantageously provides a combination fastener and foam sheet having enhanced fastener retention so that the fastener is not easily removed from the foam sheet when an outward force is applied thereto. In each of the combination fastener and foam sheet embodiments, a fastener having threaded portions is positioned within the foam sheet so that the threaded portions are retained in the foam sheet.

An embodiment of the combination fastener and foam sheet includes a foam sheet containing a polyolefin blend, a glass material, and urethane foam material. The urethane foam material preferably abuttingly contacts and substantially surrounds the polyolefin blend and glass material. The polyolefin blend contains a polyolefin that is embedded within a fibrous material. The polyolefin preferably is polyethylene or polypropylene. Other thermoplastic elastomers (TPE) can also be used as the polyolefin.

As another embodiment of the combination fastener and foam sheet, the combination preferably includes a foam sheet containing a fibrous material, a glass material, and urethane foam material. The urethane foam material preferably abuttingly contacts and substantially surrounds the fibrous and the glass materials so that the fibrous and the glass materials are substantially contained within and retained by the urethane foam material.

As yet a further embodiment of the combination fastener and foam sheet, the foam sheet also preferably includes a fibrous material and urethane foam sheet. The urethane foam material abuttingly contacts and substantially surrounds the fibrous material so that the fibrous material is substantially contained within and retained by the urethane foam material.

Along with the combination fastener and foam sheet embodiments, the present invention also advantageously provides a fastener retention foam sheet with enhanced fastener retention properties. An embodiment of the sheet includes a polyolefin blend layer, a glass layer, and urethane foam material. The urethane foam material abuttingly contacts and substantially surrounds the polyolefin blend and the glass layers so that the layers are substantially contained within and retained by the urethane foam material.

As another embodiment of the present invention, the foam sheet also preferably includes a fibrous material layer, a glass material layer, and urethane foam material. The urethane foam material abuttingly contacts and substantially surrounds the fibrous and the glass materials so that the fibrous and the glass material layers are substantially contained within and retained by the urethane foam material.

As a further embodiment of the foam sheet, the foam sheet also preferably contains a fibrous material layer and urethane foam material. The urethane foam material abuttingly contacts and substantially surrounds the fibrous material layer so that the fibrous material layer is substantially contained within and retained by the urethane foam material.

The present invention also advantageously provides a combination fastener and foam sheet, which further includes a layer of material between an outer surface of the foam sheet and the fastener. The fastener is not easily removed from the layer of material. This invention advantageously allows materials to be securely fastened to the foam sheet and any underlying surface below the foam sheet.

Methods of forming a sheet with enhanced fastener retention properties also are provided. A method of a preferred embodiment of the present invention preferably includes positioning at least one layer of a polyolefin blend and at least one layer of a glass material in a mold and adding a non-polyolefin foam material to the layers of the polyolefin blend and glass material at a velocity at which the foam material is dispersed throughout the layers of the polyolefin blend and glass materials. A typical velocity used for adding the non-polyolefin foam material is about 2.5 gallons per second for a press that makes 4 foot by 8 foot finished product sheets. The materials within the press are pressed together so that the materials are compacted to thereby increase the density of the materials and to enhance imbedding the polyolefin blend and glass material within the foam material. Pressing preferably is performed uniformly over the length of the press to prevent bowing in the foam sheet. The foam material expands throughout the mold so that the layers of the polyolefin blend and the glass material are substantially contained within and retained by the non-polyolefin foam material.

Other methods also are advantageously included within the scope of the present invention. The present invention provides a method that includes positioning at least one layer of a fibrous material and at least one layer of a glass material in a mold and adding a non-polyolefin foam material to the layers of the fibrous material and glass material at a velocity at which the foam material is dispersed throughout the layers of the fibrous and glass materials. The materials within the press are pressed together so that the materials are compacted to thereby increase the density of the materials and to enhance imbedding the fibrous and glass materials within the foam material. The foam material expands throughout the mold so that the layers of the fibrous and the glass materials are substantially contained within and retained by the non-polyolefin foam material.

The present invention further provides a method that includes positioning at least one layer of a fibrous material in a mold and adding a non-polyolefin foam material to the layer of the fibrous material at a velocity at which the foam material is dispersed throughout the layer of the fibrous material. The materials within the press are pressed together so that the materials are compacted to thereby increase the density of the materials and to enhance imbedding the fibrous material within the foam material. The foam material expands throughout the mold so that the layer of the fibrous material is substantially contained within and retained by the non-polyolefin foam material.

Another method provided within the scope of the present invention includes a method of retaining a threaded fastener within a foam sheet having enhanced fastener retention. A method of retaining a threaded fastener within the foam sheet preferably includes providing a urethane foam sheet and positioning a threaded fastener therein so that the fastener is retained within the foam sheet and is not easily removed when an outward force is applied. The method advantageously provides for variations within this method, such as the composition of the foam sheet. Any of the embodiments of the foam sheet described herein can be utilized in the method of retaining a threaded fastener within the foam sheet.

A method of preparing the polyolefin blend is also within the scope of the present invention. The polyolefin blend is created by pressing melted polyolefin between two layers of a fibrous material so that the polyolefin becomes imbedded within the fibrous materials. The polyolefin blend allows materials to adhere to a polyolefin, which typically will not occur. The polyolefin is preferably polypropylene or polyethylene.

Yet another method advantageously provided is a method of maintaining enhanced fastener retention properties in a urethane foam sheet. This method preferably includes the steps of providing a urethane foam sheet and twisting a threaded fastener into the urethane foam sheet so that the fastener becomes engaged within the urethane foam sheet. The threaded fastener is then removed so that the foam sheet still retains its enhanced fastener retention properties. After repeated performance of this method, most foam sheets would lose all retention capabilities in the location in which the fastener had been installed. With the present invention, the foam sheet maintains its fastener retention properties remarkably well.

BRIEF DESCRIPTION OF THE INVENTION

Some of the features, advantages, and benefits of the present invention having been stated, others will become apparent as the description proceeds when taken in conjunction with the accompanying drawings in which:

FIG. 1 is an exploded perspective view of a plurality of layers of glass material and fibrous material positioned in a molding cavity according to the present invention;

FIG. 2 is a perspective view of heated polyurethane foam being poured into a sheet of material in a molding cavity to mix with glass and fibrous material layers according to the present invention;

FIG. 3 is a perspective view of a plurality of layers of material after being molded together in a mold cavity according to the present invention;

FIG. 4 is a fragmentary perspective view of a molded sheet of foam material having scrap carpet and glass material therein taken along line 4—4 of FIG. 3 according to a first embodiment of the present invention;

FIG. 6 is a fragmentary perspective view of a sheet of foam material having a sheet or layer of perforated screen material according to another embodiment of the present invention;

FIG. 7 is an enlarged sectional view of a sheet of foam material taken along line 6—6 of FIG. 6 according to the present invention;

FIG. 8 is a fragmentary perspective view of a sheet of foam material having a sheet or layer of perforated plastic material according to an embodiment of the present invention;

FIG. 9 is an enlarged sectional view of a sheet of foam material taken along line 9—9 of FIG. 8 according to the present invention;

FIG. 10 is a perspective view of a combination fastener and foam sheet according to the present invention;

FIG. 11 is a perspective view of a combination fastener and foam sheet according to the present invention;

FIG. 12 is an enlarged sectional view of a combination fastener and foam sheet taken along line 11—11 of FIG. 11 according to the present invention;

FIG. 13 is an enlarged sectional view of a combination fastener and foam sheet with a layer of material secured between the fastener and the foam sheet according to the present invention;

FIG. 14 is a perspective view a layer of a melted polyolefin positioned between two layers of fibrous materials within a press for making a polyolefin blend material, which is a component of several embodiments of the present invention;

DETAILED DESCRIPTION

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime, double prime, and triple prime notation, where used, generally indicate similar elements in alternative embodiments.

As shown in FIGS. 1–18, the present invention provides a fibrous and foam sheet and methods of molding fibrous material with a non-polyolefin foam material, e.g., urethane, to thereby enhance attachment capabilities of a fastener extending into or through the sheet. The foam material for all embodiments of the present invention is preferably a high density, high strength, and low weight foam such as polyurethane. For example, the density preferably is in the range of about 18 pounds per cubic foot to about 28 pounds per cubic foot. The foam material can be pure, filled, or recycled. Such applications, for example, include boats, trucking floors, cabinets, ice arenas, agricultural building floors, reusable concrete forms, and many other applications where high strength and fastener retention can be important.

Figure 18:
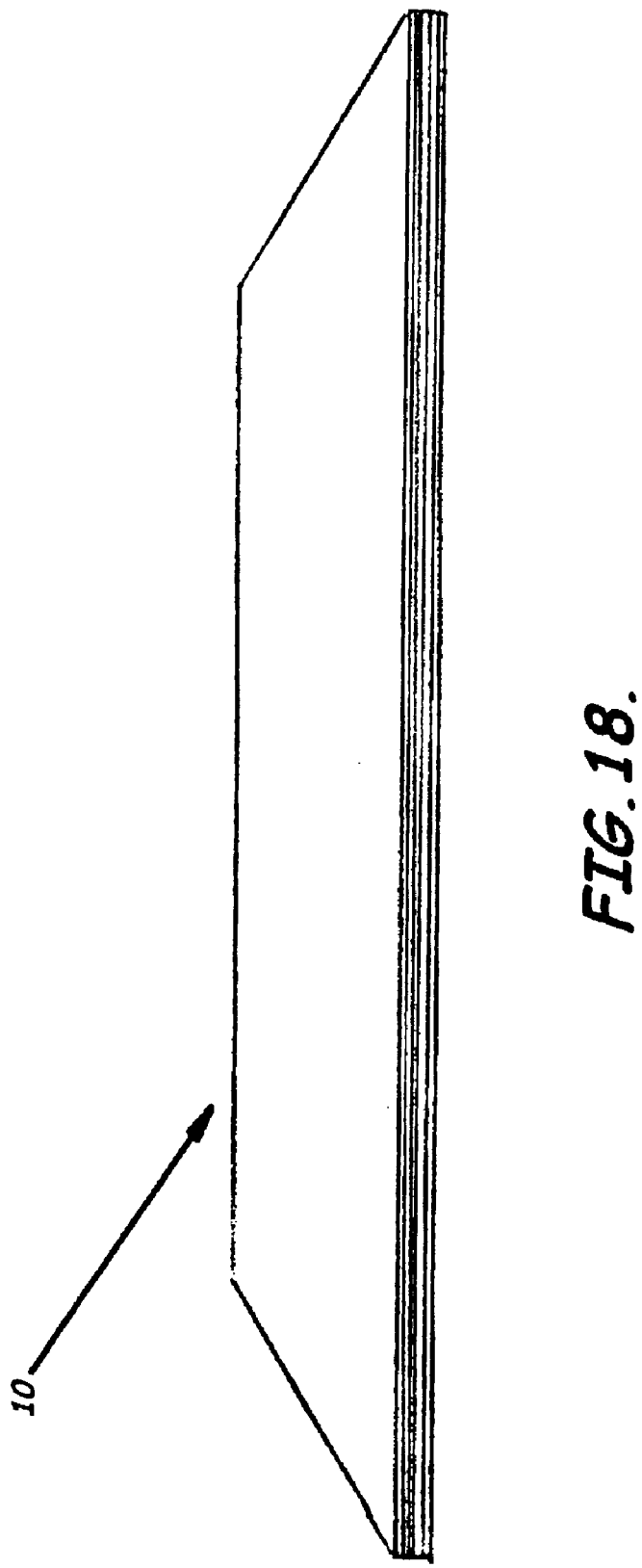
FIG. 18 is a perspective view of a foam sheet having enhanced fastener retention properties in accordance with an embodiment of the present invention.

In each embodiment of the foam sheet 10, the foam sheet 10 is preferably formed in a sheet, board, panel, or wall (all referenced herein as a sheet), as shown in FIG. 18, and has enhanced fastener retention properties so that when a fastener 24 having threaded portions 26 is positioned within the foam sheet 10 the fastener 24 is not easily removed from the foam sheet 10 when an outward force is applied thereto. Examples of such outward force can include pulling the fastener 24 outward or applying downward pressure on the fastener 24. It will also be understood, however, that various other types of foam products can be formed or molded according to the present invention, such as pallets, containers, and panels. In all embodiments of the foam sheet 10 and combination fastener 24 and foam sheet 10, the foam sheet 10 has a fastener torque test, e.g. screw torque test, result, which will be described in greater detail herein, in the range of about 20 inch-pounds to about 45 inch-pounds.

Figure 5:
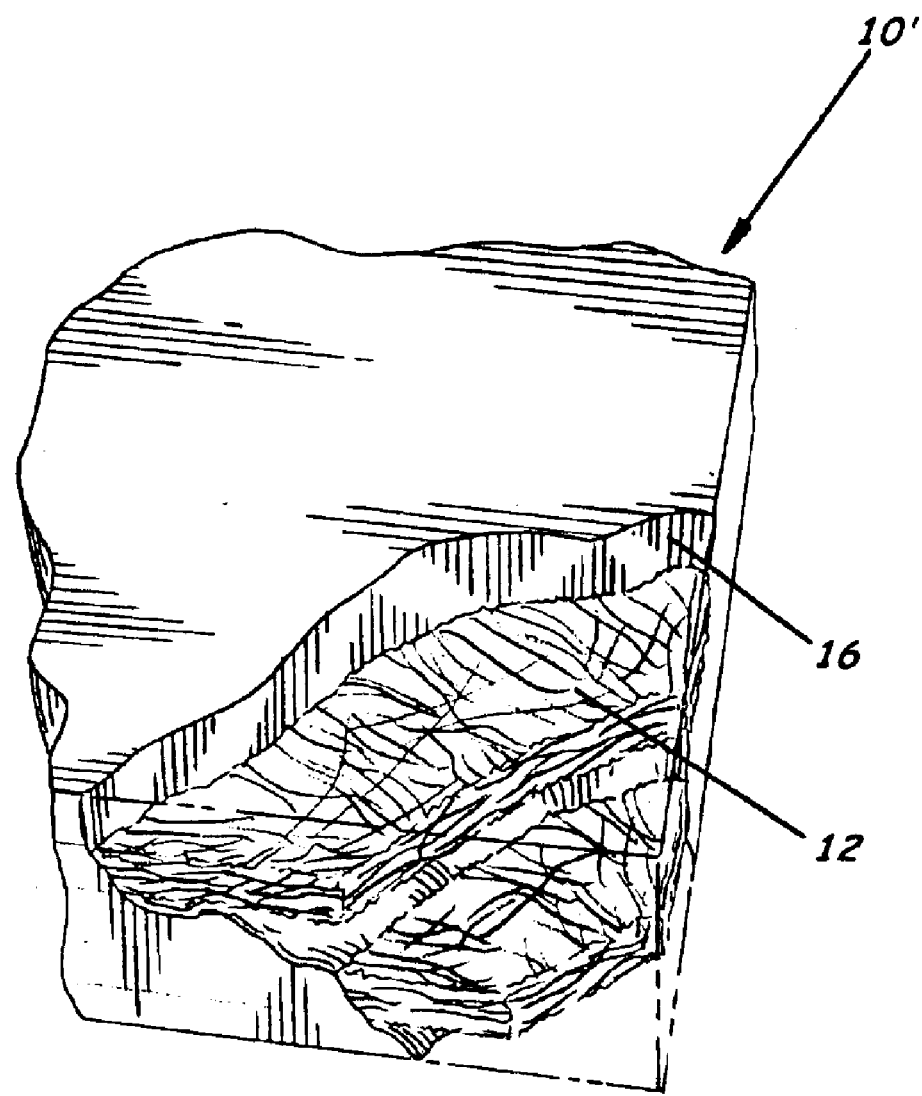
FIG. 5 is a fragmentary perspective view of a molded sheet of foam material having animal hair, namely swine hair, according to an embodiment of the present invention.

In one embodiment of the present invention, the foam sheet 10 preferably includes a fibrous material 12, a strengthening material such as glass, and the non-polyolefin foam material 16. The non-polyolefin foam material 16 preferably contacts and substantially surrounds the fibrous material 12 and the glass material 14. The present invention is also embodied in a foam sheet 10' preferably containing a fibrous material 12 and a non-polyolefin foam material 16. The non-polyolefin foam material 16 preferably contacts and substantially surrounds the fibrous material 12. Examples of this embodiment are shown in FIGS. 5, 6, and 8. FIG. 5 demonstrates the use of animal hair, and more particularly swine or hog hair, as the fibrous material 12. FIG. 6 shows the use of a perforated metal screen material as the fibrous material 12. FIG. 8 shows the use of a perforated plastic material as the fibrous material 12 in the foam sheet 10'.

Figure 16:
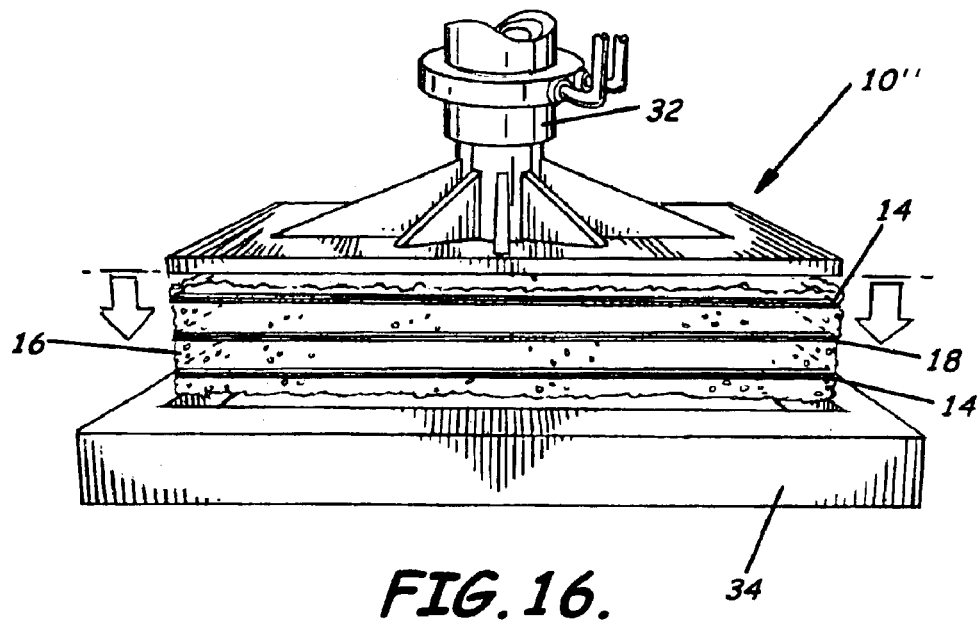
FIG. 16 is an exploded perspective view of a plurality of layers of glass material, a polyolefin blend material, and urethane foam material positioned in a and being compressed within a molding cavity according to the present invention.

The composition of the foam sheet 10 can vary depending upon the degree of fastening retention that is required for a particular installation. One particularly effective embodiment of the foam sheet 10" includes a polyolefin blend 18, the glass material 14, and the non-polyolefin foam material 16. The foam material 16 preferably contacts and substantially surrounds the remaining materials, as shown in FIG. 16.

In all embodiments containing the polyolefin blend 18, the polyolefin blend 18 preferably is formed of a polyolefin 20 and a fibrous material 22, as shown in FIG. 14. The polyolefin 20 is preferably selected from the group consisting of polyethylene and polypropylene. The method of preparing the polyolefin blend 18, which is also within the scope of the present invention, is described in greater detail later within the specification.

As shown in the figures, the present invention also provides a combination fastener 24 and foam sheet 10 having enhanced retention so that the fastener 24 is not easily removed from the foam sheet 10 when an outward force is applied thereto. A combination fastener 24 and foam sheet 10 embodiment exists for each of the described foam sheet 10 embodiments, as shown in FIGS. 11 and 12. One embodiment of the combination preferably includes a foam sheet 10' including a fibrous material 12 and a non-polyolefin foam material 16 abuttingly contacting and substantially surrounding the fibrous material 12 so that the fibrous material 12 is substantially contained within and retained by the non-polyolefin foam material 16. A fastener 24, such as screw, bolt, threaded eyelet, or other types of fasteners, preferably has threaded portions 26 positioned within the foam sheet 10 so that the threaded portions 26 are retained in the foam sheet 10' and are not easily removed when an outward force is applied thereto.

The combination fastener 24 and foam sheet 10 having a fibrous material 12 preferably further includes a sheet of glass material 14. The glass material 14 is also being substantially surrounded by the foam material 16 to enhance rigidity, flex-strength, and compression strength. Glass also helps limit the thermal coefficient of linear expansion of the foam sheet 10. The glass material 14 can be a woven glass, a non-woven glass, and combinations thereof in all embodiments of the present invention. The glass material 14 is preferably coated or substantially surrounded with a polyvinyl chloride ("PVC") material or other polymeric material as understood by those skilled in the art. Woven glass is the preferred glass material 14 for each embodiment, with woven roving glass being an example of such.

An embodiment of the fastener 24 and foam sheet 10 combination preferably includes a foam sheet 10" having a polyolefin blend 18, a glass material 14, and a non-polyolefin foam material 16. The non-polyolefin foam material 16 preferably contacts and substantially surrounds the polyolefin blend 18 and the glass material 14. This embodiment is particularly effective for retaining threaded fasteners therein.

Another embodiment of the present invention includes a combination comprising a foam sheet 10, a threaded fastener 24, and a layer of material 30 between an outer surface of the foam sheet 10 and the threaded fastener 24. The threaded fastener 24 is not easily removed from the foam sheet 10 and layer of material 30, as illustrated in FIG. 13. It is envisioned that the fastener 24 will be secured to the foam sheet 10, as well as, the overlying layer of material 30. The fastener 24 can also be secured to a surface below the foam sheet 10 (not shown), thereby securing the foam sheet 10 and the overlying material to the lower surface. This embodiment can be used in various installations, such as to secure flooring to a foam sheet 10 or add metallic strips to vehicles. Other applications of this embodiment will known to those skilled in the art and are to be considered within the scope of the present invention.

The fibrous material 12 used in all embodiments of the present invention preferably has a plurality of interconnecting fibers having high elasticity, and more preferably includes at least one of the following: animal hair, scrap carpet material, a screen material, a metal shaving material, a plastic particulate material, and a glass particulate material. Examples of animal hair include hog hair and horse hair. The screen material preferably is a metal material, and the metal material preferably maintains position due to density of urethane foam material 16 surrounding metal material. The screen material, however, can also be plastic or fiberglass. The synthetic fibers can be a needle punched polyester such as those manufactured by Trevira GmbH headquartered in Frankfurt, Germany; a thermoplastic elastomer; nylon; and combinations thereof. Some of the synthetic fibers can be found within the scrap carpet and carpet fibers. The plastic and glass particulate materials are preferably prepared by sanding a finished product foam sheet 10 of the present invention and capturing the resulting dust from the sanding.

Although specific examples for components of the fibrous material 12 have been given, other suitable materials within each category will be known to those skilled in the art and are to be considered within the scope of this invention. The same examples of materials can be used for all of the embodiments of the present invention that are discussed with respect to methods of forming the foam sheets 10.

The finished product foam sheet 10 preferably has a density in the range of about 20 pounds per cubic foot to about 30 pounds per cubic foot. Generally, the higher the density of the foam sheet 10, the higher the degree of retention properties. Table A summarizes the density of several embodiments of the foam sheet 10, constructed in accordance with the descriptions contained herein.

Several tests have been developed for determining various properties of foam sheets. Some of these tests include a fastener torque test, a compression test, and a shear test.

The fastener torque test is used to measure the fastener retention characteristics of foam sheets. The fastener torque test is performed by placing a washer under the head of a ¾" diameter, #8 pinhead cap screw and tightening the screw and washer within the target material, e.g. the foam sheet 10, using a 1 inch-pound torque wrench. The screw and washer are tightened until either the screw head breaks or is stripped, at which point a torque measurement is taken. This torque measurement is the fastener torque test result. The finished product foam sheets 10 of the present invention typically have a fastener torque test result in the range of about 20 inch-pounds to about 45 inch-pounds. The same test performed on plywood gives a fastener torque test result in the range of about 31 inch-pounds to about 45 inch-pounds. By comparing the results of the foam sheet 10 of the present invention to that of plywood, it is apparent that the foam sheet 10 has enhanced fastener retention properties similar to that of wood. Wood has tremendous fastener retention properties, while prior art foam sheets 10 do not. The results of this test are shown in Table A. The foam sheet samples using a thermoplastic elastomer (TPE) contain a bonding veil, as described herein, or the surface of the TPE has been prepared to accept urethane.

TABLE A

FASTENER TORQUE TEST RESULTS

| Foam sheet Thickness, Inch | Foam sheet Description | Required Torque, inch-pounds |
|---|---|---|
| ¾ | 5 ply plywood | 32+ |
| ¾ | 5 ply plywood, resin and glass on both sides | 35+ |
| ½ | 18 lb/ft$^3$ polyurethane with woven roving glass mat | 11 |
| ½ | 24 lb/ft$^3$ polyurethane with 1 layer screw veil | 15.5 |
| ½ | 30 lb/ft$^3$ polyurethane with woven roving glass mat | 17 |
| ½ | 30 lb/ft$^3$ polyurethane with 1 layer Z fiber | 22 |
| ½ | X 3000 2C, 2 layers Z fibers | 22.6 |
| ¾ | 24 lb/ft$^3$ polyurethane with continuous strand non-woven glass mat | 17.5 |
| ¾ | 18 lb/ft$^3$ polyurethane with 1 layer screw veil | 18.1 |
| ¾ | 18 lb/ft$^3$ polyurethane with 1 layer Z fiber | 18.4 |
| ¾ | 30 lb/ft$^3$ polyurethane with continuous strand non-woven glass mat and fibers | 45+ |
| 1½ | 30 lb/ft$^3$ polyurethane with continuous strand non-woven glass mat | 21 |

TABLE A-continued

FASTENER TORQUE TEST RESULTS

| Foam sheet Thickness, Inch | Foam sheet Description | Required Torque, inch-pounds |
|---|---|---|
| ½ | 0.175 TPE with 15 lb./ft³ density polyurethane (PU) | 19 |
| ¾ | 0.175 TPE with 15 lb./ft³ density PU | 19 |
| ½ | 0.175 TPE with 20 lb./ft³ density PU | 20 to 24 |
| ¾ | 0.175 TPE with 20 lb./ft³ density PU | 20 to 24 |
| ½ | 0.175 TPE with 24 lb./ft³ density PU | 20 to 24 |
| ¾ | 0.175 TPE with 24 lb./ft³ density PU | 20 to 24 |
| ½ | TPE (60 lb/ft³) | 21 to 27 |
| ¾ | TPE (60 lb/ft³) | 21 to 27 |

Compression tests are typically performed on foam materials, in accordance with ASTM D3574-01 Standard Test Methods for Flexible Cellular Materials—Slab, Bonded, and Molded Urethane Foams. In this test, a steel plate is placed on a top surface of a five inch by five inch or six inch by six inch square of the foam sheet 10. A force is exerted on the steel plate, thereby pushing the plate into the square sample. Once the thickness of the square is compressed ten percent, the force measurement is taken. This test can be performed perpendicular to the orientation of the layers within the foam sheet 10, as well as, parallel to the orientation of the foam sheet 10 layers. Table B contains the results of performing the compression tests upon several samples of the foam sheet 10 constructed in accordance with the present invention.

TABLE B

| Sample Description | Density, pounds per cubic foot | Parallel Compression, psi | Perpendicular Compression, psi | Flex, psi |
|---|---|---|---|---|
| 24 lb/ft³ urethane board with two layers of continuous strand non-woven glass, ½ No Pigment | 22.44 | 520 | 2403 | 2955 |
| 24 lb/ft³ urethane board with two layers of continuous strand non-woven glass, ½ Pigment | 22.73 | 523 | 1998 | 2398 |
| 24 lb/ft³ urethane board with four layers of continuous strand non-woven glass | 25.39 | 576 | 2750 | 2312 |
| 24 lb/ft³ urethane board with three layers of continuous strand non-woven glass, ¾" Dust | 25.9 | 584 | 1777 | 1786 |
| 24 lb/ft³ urethane board with three layers of continuous strand non-woven glass, ¾" Grinder chunks | 24.5 | 467 | 1416 | 1444 |
| 24 lb/ft³ urethane board with two layers of continuous strand non-woven glass and Dust | 26 | 406 | | 1814 |
| Polyethylene and 24 lb/ft³ urethane board with two layers of continuous strand non-woven glass | 26.38 | 322 | 1147 | 1620 |
| 24 lb/ft³ urethane board with two layers of continuous strand non-woven glass and Needle punched non-woven polyester with nylon. | 24.43 | 231 | | 1104 |

The shear test is used to determine the strength of various adhesives and how well the adhesives bond to the structural surface of urethane foam sheets. To perform the shear test, two one inch by six inch blocks of foam are supplied. Adhesive is placed on an end of a first block with the second block being placed on top of the first block so that a one inch by one inch area overlaps with the adhesive applied between the two blocks. The adhesive is allowed to dry. The two blocks are then pulled apart, shearing the adhesive joint. The goal is for the foam to shear, and not the adhesive. The shear test is used as a predictor for a failure mode.

Three foam sheets were tested in which the perpendicular shear results were recorded. Sample 1 contained the following layers: a 0.47 inch thick polyurethane layer, two 24 ounce woven glass layers having a density of approximately 20 lb/ft$^3$, a polyolefin blend 18 layer made from 0.13 inch thick polyethylene and Trevira needle punched polyester, and four layers of chopped fibers. Sample 1 had an average perpendicular shear test result of 272 psi. Sample 2 contained the following layers: two 24 ounce woven glass layers having a density of approximately 20 lb/ft$^3$, a polyolefin blend 18 layer made from 0.44 inch thick polyethylene and Trevira needle punched polyester, and four layers of chopped fibers. Sample 2 had an average perpendicular shear test result of 401 psi. Sample 3 contained the following layers: one 0.5 inch thick polyurethane, two 24 ounce woven glass layers with a density of approximately 20 lb/ft$^3$, and four layers of chopped fibers. Sample 3 had an average perpendicular shear test result of 291 psi. As shown from the shear test results, the sample with the thickest polyolefin blend 18 layer had the highest shear test result.

Figure 17:
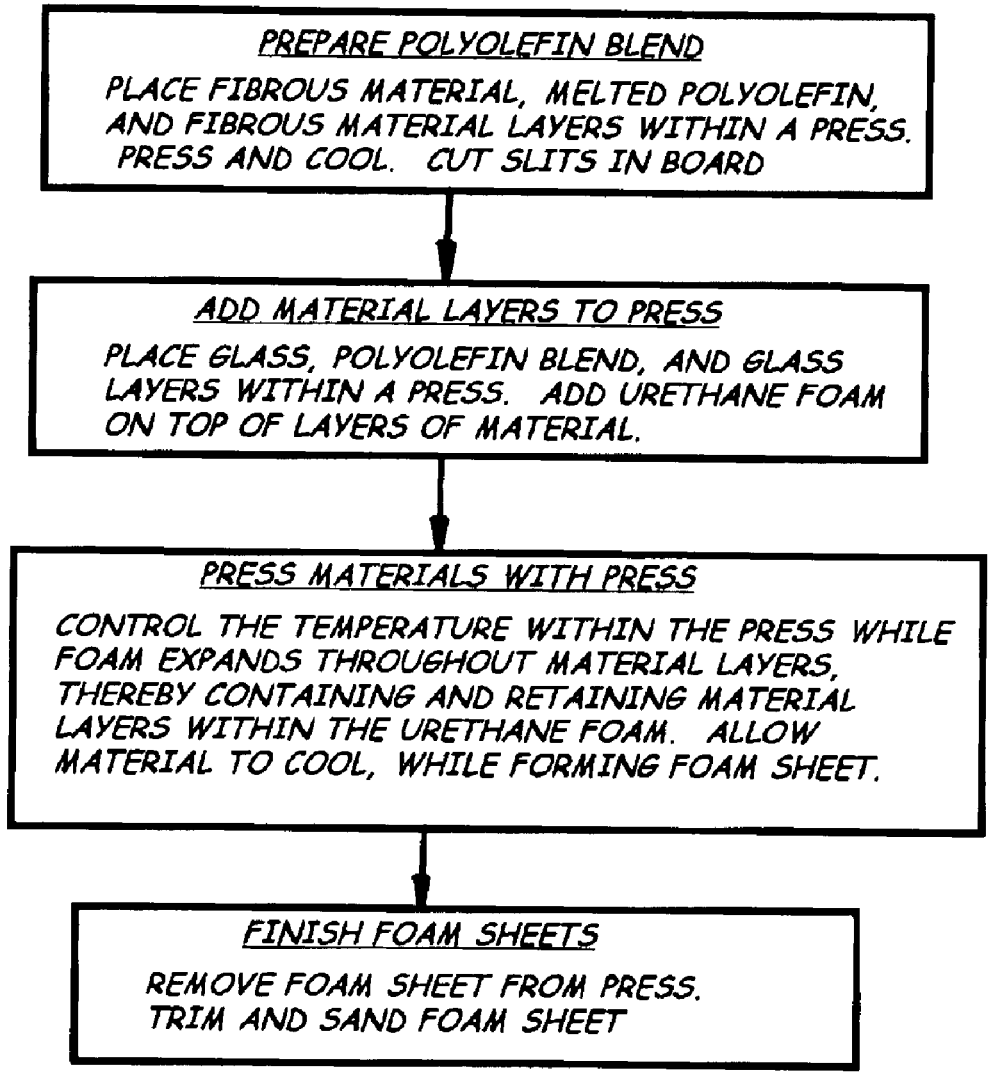
FIG. 17 is a simplified block diagram for the process of making the foam sheet of the present invention with the use of a polyolefin blend and glass materials being embedded within a urethane foam according to the present invention.

As shown in the figures, multiple variations of the method of forming a foam sheet 10 with enhanced fastener retention properties are provided. The method of forming a foam sheet 10 can be varied based upon the layers of materials that are used to construct the foam sheet 10. The number of layers, the composition of each layer, and the order of adding layers can be varied to make the foam sheet 10 of the present invention. An example flowchart of a preferred method of the present invention is shown in FIG. 17.

The preferred method of the present invention includes positioning at least one layer of a polyolefin blend 18 and at least one layer of a glass material 14 in a mold 34 and adding a non-polyolefin foam material 16 to the layers of the polyolefin blend 18 and glass material 14 at a velocity at which the foam material 16 is dispersed throughout the layers of the polyolefin blend 18 and glass material 14, as shown in FIG. 16. The non-polyolefin material is preferably maintained at 80° F. prior to being added to the layers of material in the press 32 in all embodiments to help control how quick the materials in the mold 34 will cure.

Once all of the materials have been added to the press 32, the materials are pressed together so that the materials are compacted to increase the density of the materials and to enhance imbedding the polyolefin blend 18 and glass material 14 within the foam material 16, as illustrated in FIG. 16. The temperature within the press 32 is maintained while the foam material 16 expands throughout the mold 34 so that the layers of the polyolefin blend 18 and the glass material 14 are substantially contained within and retained by the non-polyolefin foam material 16.

When forming the foam sheets within the press 32, the preferred press 32 temperature for all embodiments is 72° F. To maintain 72° F., it is necessary to add heat for some formulations, while it is necessary to remove heat from others. If thinner layers of material are used within the press 32, e.g. ½" to 1" thick, then heat is typically added to warm the materials to the desired temperature. If thicker layers of material are used, e.g. over 1½", then the materials typically need to be cooled. Maintaining the temperature controls how quick the foam material 16 dissipates throughout the mold 34 and how quick the materials cure within the mold 34.

The polyolefin blend 18 is one component that is contained within many of the preferred embodiments of the foam sheet 10" and combination fastener 24 and foam sheet 10". A simplified block diagram outlining the method of forming a foam sheet 10" using a polyolefin blend 18 is contained in FIG. 17. Along with the composition of the polyolefin blend 18, a method of preparing the blend is also included.

Figure 15:
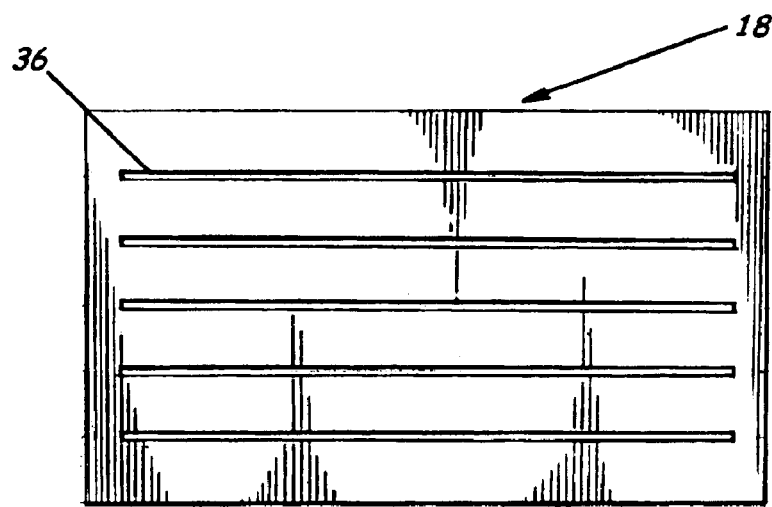
FIG. 15 is a top perspective view of a polyolefin blend material used as a component of the foam sheet of the present invention.

The method of preparing the polyolefin blend 18 preferably includes the steps of positioning a first fibrous material 22 in a press 32, followed by positioning a melted polyolefin 20 in the press 32, and then positioning a second fibrous material 22 in the mold 34. The melted polyolefin 20 is made by heating a polyolefin 20 to approximately 360° F., which makes the polyolefin 20 in a gel-like state. Once the materials are in the mold 34, the melted polyolefin 20 is compressed between the first and second fibrous materials 22 within the press 32 wherein the polyolefin 20 virtually becomes mechanically embedded with the fibrous materials 22, as shown in FIG. 14. The polyolefin blend 18 is then cooled prior to positioning the polyolefin blend 18 in the mold 34 as a component of the foam sheet 10. Cooling is typically performed by adding a water jacket to the mold 34. Once the polyolefin blend 18 is cooled, the polyolefin blend 18 is removed from the press 32 and will be in the form of a board. The boards 18 are preferably 0.050 inches to 3 inches in thickness, and more preferably about 0.080 inches thick. As shown in FIG. 15, slits 36 are cut within the polyolefin blend 18 boards to allow the non-polyolefin foam material 16 to penetrate through the polyolefin blend 18 boards when forming the foam sheet 10" embodiments within the press 32. The slits 36 ensure that non-polyolefin foam material 16 is allowed to fully encapsulate the polyolefin blend 18 within the non-polyolefin foam material 16. The slits 36 preferably have a width of 0.030 inches and are spaced 1 inch apart to allow the foam material 16 to move freely around the polyolefin blend 18 boards.

When preparing the polyolefin blend 18, it is preferable to utilize a first and a second fibrous material 22, or bonding veil, comprising at least one sheet of fibrous material 12 to enhance bonding of the polyolefin to the non-polyolefin foam material 16. The polyolefin 20, which is typically difficult to adhere to, becomes imbedded within the fibrous materials 22. Examples of such a fibrous material 12 include needle punched polyester fiber, hemp, and kraft paper.

An alternate method of forming a urethane foam sheet 10 having enhanced fastener retention properties is supplied. In this embodiment, the method comprises positioning at least one layer of a fibrous material 12 and at least one layer of a glass material 14 in a mold 34 and adding a non-polyolefin foam material 16 to the layers of the fibrous material 12 and the glass material 14 at a velocity wherein the non-polyolefin foam material 16 is dispersed throughout the layers of the fibrous material 12 and the glass material 14 in the mold 34. FIGS. 3 and 4 illustrate how the foam material 16 fully encapsulates and penetrates the fibrous material 12 and glass material 14 layers. After the foam material 16 has been added, the materials within the press 32 are compressed together in the mold 34 so that the materials are compacted, thereby increasing the density of the materials, and imbedding the layers of the fibrous material 12 and the glass material 14 within the non-polyolefin foam material 16. Examples illustrating this embodiment are shown in FIGS. 1, 2, and 10. While the materials are being pressed, the temperature within the press 32 is controlled while the non-polyolefin foam material 16 expands throughout the mold 34 so that the layers of the fibrous material 12 and the glass material 14 are substantially contained within and retained by the non-polyolefin foam material 16.

Yet another embodiment of a method of forming a urethane foam sheet 10' is provided. In this embodiment, the method comprises the steps of positioning at least one layer of a fibrous material 12 in a mold 34 and adding a non-polyolefin foam material 16 to the layer of the fibrous material 12 at a velocity wherein the non-polyolefin foam material 16 is dispersed throughout the layer of the fibrous material 12. Once the materials are added to the mold 34, the materials are pressed in the mold 34 so that the materials are compacted, thereby increasing the density of the materials, and the layer of the fibrous material 12 becomes imbedded within the non-polyolefin foam material 16. The temperature of the material in the press 32 is controlled, as previously described, while the non-polyolefin foam material 16 expands throughout the mold 34 so that the layer of the fibrous material 12 is substantially contained within and retained by the non-polyolefin foam material 16.

The invention also includes methods of retaining a fastener 24 within a urethane foam sheet 10 having enhanced fastener retention. One preferred method of retaining a fastener 24 within a foam sheet 10 can be varied by utilizing a urethane foam sheet 10''' comprising a polyolefin blend 18, a glass material 14, and a non-polyolefin foam material 16, the non-polyolefin foam material 16 contacting and substantially surrounding the polyolefin blend 18 and the glass material 14. Another method of retaining a fastener 24 with a foam sheet 10 includes providing a urethane foam sheet 10 comprising a fibrous material 12, a glass material 14, and a non-polyolefin foam material 16, the non-polyolefin foam material 16 contacting and substantially surrounding the fibrous material 12 and the glass material 14. Yet another embodiment of retaining a threaded fastener 24 within the foam sheet 10 includes providing a urethane foam sheet 10' comprising a fibrous material 12 and a non-polyolefin foam material 16, the non-polyolefin foam material 16 contacting and substantially surrounding the fibrous material 12.

In addition to the methods provided for retaining a threaded fastener 24 within a foam sheet 10, other methods related to use of the foam sheet 10 and fastener 24 are also provided. The present invention further includes positioning another layer of material 30 between the urethane foam sheet 10 and the fastener 24 wherein the fastener 24 secures the overlying material to the foam sheet 10 or to the foam sheet 10 and underlying material beneath the foam sheet 10. Some examples envisioned that this method can be used for include installing flooring over the foam sheet 10, adding chrome strips to automobiles, and securing bumpers to vehicles. Other examples will be known to those skilled in the art and are to be considered within the scope of the present invention.

Yet another embodiment of the present invention includes a method of retaining enhanced fastener retention properties in a urethane foam sheet 10 comprising the steps of providing a urethane foam sheet 10; twisting a threaded fastener 24 into the urethane foam sheet 10, wherein the fastener 24 becomes engaged within the urethane foam sheet 10; and removing the threaded fastener 24 from the urethane foam sheet 10, wherein the foam sheet 10 retains its enhanced fastener retention properties. The density of the foam sheet 10 increases in the surface area of the foam that abuttingly contacts the inserted threaded fastener 24, which helps in retaining the fastener 24 within the foam sheet 10. Once the fastener 24 is removed, the foam sheet 10 resiliently maintains the fastener retention properties that will allow another fastener 24 to be inserted in the same place and will retain this second fastener 24 within the foam sheet 10 also. Even with repetitively performing this method, the foam sheet 10 maintains its fastener retention properties.

As an advantage of this invention, the new foam sheets will enable users to securely fasten materials to a foam sheet 10 alone or to an underlying surface behind the foam sheet 10. The foam sheet 10 of the present invention possesses similar fastener retention properties to wood, which has an excellent ability to retain fasteners. This will enable many surfaces to be softened by adding the foam sheet 10 as another layer to the installation. The foam sheet 10 can be used below an overlying material, such as for padding for flooring, or the foam sheet 10 can be added on top of an underlying surface, such as for installing handles on car doors. The improved fastener retention properties of the foam sheet 10 will allow thicker layers of the foam sheet 10 to be used.

As another advantage of the present invention, threaded fasteners will securely remain in the foam sheet 10 when the fastener 24 has a forced applied to it. Repeated insertion and removal of the threaded fastener 24 will not affect the fastener retention properties of the foam sheet 10. This will allow foam sheets to last longer, since the threaded fasteners will not destroy the foam sheet 10 in the area that abuttingly contacts the threaded fasteners, as which occurs with current foam sheets.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed.

What is claimed is:

1. A combination fastener and foam sheet having enhanced fastener retention so that the fastener is not easily removed from the foam sheet when an outward force is applied thereto, the combination comprising:

a foam sheet having a polyolefin blend, a glass material, and a non-polyolefin foam material, the non-polyolefin foam material contacting and substantially surrounding the polyolefin blend and the glass material, the polyolefin blend comprising a polyolefin and a fibrous material, the polyolefin being selected from the group consisting of polyethylene and polypropylene and the fibrous material comprising at least one sheet of fibrous material to enhance bonding of the polyolefin to the non-polyolefin foam and the non-polyolefin foam material comprising a high density, high strength, and lightweight foam, the high density being in a range of about 18 pounds per cubic foot to about 28 pounds per cubic foot; and a fastener having threaded portions positioned within the foam sheet so that the threaded portions are retained in the foam sheet and are not easily removed when an outward force is applied thereto.

2. A combination as defined in claim 1, wherein the foam sheet has a fastener torque test result in the range of about 20 inch-pounds to about 45 inch-pounds.

3. A combination as defined in claim 1, further including a layer of material between an outer surface of the foam sheet and the fastener, wherein the fastener is not easily removed from the layer of material.

4. A combination fastener and foam sheet having enhanced fastener retention so that the fastener is not easily removed from the foam sheet when an outward force is applied thereto, the combination comprising:
a foam sheet having a polyolefin blend, a glass material, and a non-polyolefin foam material, the non-polyolefin foam material contacting and substantially surrounding the polyolefin blend and the glass material, the polyolefin blend comprising a polyolefin and a fibrous material, the polyolefin being selected from the group, consisting of polyethylene and polypropylene and the fibrous material comprising at least one sheet of fibrous material to enable bonding of the polyolefin to the non-polyolefin foam material, the foam sheet having a fastener torque test result in a range of about 20 inch-pounds to about 45 inch-pounds and a density in the range of about 20 pounds per cubic foot to about 30 pounds per cubic foot; and
a fastener having threaded portions positioned within the foam sheet so that the threaded portions are retained in the foam sheet and are not easily removed when an outward force is applied thereto.

5. A combination as defined in claim 4, wherein the fibrous material comprises a synthetic fiber.

6. A combination as defined in claim 4, wherein the fibrous material comprises a natural fiber.

7. A combination as defined in claim 4, wherein the glass material comprises a sheet of woven glass.

8. A combination as defined in claim 4, wherein the glass material comprises a sheet of non-woven glass.

9. A combination as defined in claim 4, wherein the fibrous material comprises at least one of the following: animal hair, scrap carpet material, a screen material, a metal shaving material, a plastic particulate material, and a glass particulate material.

10. A combination as defined in claim 4, wherein the non-polyolefin foam material comprises urethane.

11. A foam sheet having enhanced fastener retention so that when a fastener, having threaded portions is positioned within the foam sheet, the fastener is not easily removed from the foam sheet when an outward force is applied thereto, the foam sheet comprising: a polyolefin blend, a glass material, and a non-polyolefin foam material, the non-polyolefin foam material contacting and substantially surrounding the polyolefin blend and the glass material, the polyolefin blend comprising a polyolefin and a fibrous material, the polyolefin being selected from the group consisting of polyethylene and polypropylene and the fibrous material comprising at least one sheet of fibrous material to enhance bonding of the polyolefin to the non-polyolefin foam material, and the non-polyolefin foam material comprising a high density, high strength, and lightweight foam, the high density being in a range of about 18 pounds per cubic foot to about 28 pounds per cubic foot.

12. A foam sheet as defined in claim 11, wherein the foam sheet has a fastener torque test result in the range of about 20 inch-pounds to about 45 inch-pounds.

13. A foam sheet as defined in claim 11, wherein the non-polyolefin foam material comprises urethane.

14. A foam sheet having enhanced fastener retention so that when a fastener, having threaded portions is positioned within the foam sheet, the fastener is not easily removed from the foam sheet when an outward force is applied thereto, the foam sheet comprising: a polyolefin blend, a glass material, and a non-polyolefin foam material, the polyolefin blend comprising a polyolefin and a fibrous material, the polyolefin being selected from the group consisting of polyethylene and polypropylene and the fibrous material comprising at least one sheet of fibrous material to enable bonding of the polyolefin to the non-polyolefin foam material, the non-polyolefin foam material contacting and substantially surrounding the polyolefin blend and the glass material, the foam sheet having a fastener torque test result in the range of about 20 inch-pounds to about 45 inch-pounds and a density in the range of about 20 pounds per cubic foot to about 30 pounds per cubic foot.

15. A foam sheet as defined in claim 14, wherein the fibrous material comprises a synthetic fiber.

16. A foam sheet as defined in claim 14, wherein the fibrous material comprises a natural fiber.

17. A foam sheet as defined in claim 14, wherein the glass material comprises a sheet of woven glass.

18. A foam sheet as defined in claim 14, wherein the glass material comprises a sheet of non-woven glass.

19. A foam sheet as defined in claim 14, wherein the fibrous material comprises at least one of the following: animal hair, scrap carpet material, a screen material, a metal shaving material, a plastic particulate material, and a glass particulate material.

20. A combination fastener and foam sheet having enhanced fastener retention so that the fastener is not easily removed from the foam sheet when an outward force is applied thereto, the combination comprising:
a foam sheet having a fibrous material, a glass material, and a non-polyolefin foam material, the foam sheet having a fastener torque test result in the range of about 20 inch-pounds to about 45 inch-pounds, the non-polyolefin foam material contacting and substantially surrounding the fibrous material and the glass material, the fibrous material comprising at least one sheet of fibrous material to enhance bonding of the non-polyolefin foam material, the non-polyolefin foam material comprising a high density, high strength, and lightweight foam, and the high density being in a range of about 18 pounds per cubic foot to about 28 pounds per cubic foot; and
a fastener having threaded portions positioned within the foam sheet so that the threaded portions are retained in the foam sheet and are not easily removed when an outward force is applied thereto.

21. A combination as defined in claim 20, further including a layer of material between an outer surface of the foam sheet and the fastener, wherein the fastener is not easily removed from the layer of material.

22. A combination fastener and foam sheet having enhanced fastener retention so that the fastener is not easily removed from the foam sheet when an outward force is applied thereto, the combination comprising:
a foam sheet having a fibrous material, a glass material, and a non-polyolefin foam material, the foam sheet having a fastener torque test result in the range of about 20 inch-pounds to about 45 inch-pounds, the fibrous material comprising at least one sheet of fibrous material to enhance bonding of the non-polyolefin foam material, the non-polyolefin foam material contacting and substantially surrounding the fibrous material and the glass material, the foam sheet having a density in the range of about 20 pounds per cubic foot to about 30 pounds per cubic foot; and
a fastener having threaded portions positioned within the foam sheet so that the threaded portions are retained in the foam sheet and are not easily removed when an outward force is applied thereto.

23. A combination as defined in claim 22, wherein the fibrous material comprises at least one of the following: a synthetic fiber, a natural fiber, animal hair, scrap carpet material, a screen material, a metal shaving material, a plastic particulate material, and a glass particulate material.

24. A combination as defined in claim 22, wherein the glass material is selected from the group consisting of a sheet of woven glass and a sheet of non-woven glass.

25. A combination as defined in claim 22, wherein the non-polyolefin foam material comprises urethane.

26. A foam sheet having enhanced fastener retention so that when a fastener, having threaded portions is positioned within the foam sheet, the fastener is not easily removed from the foam sheet when an outward force is applied thereto, the foam sheet having a fastener torque test result in the range of about 20 inch-pounds to about 45 inch-pounds, the foam sheet comprising: a fibrous material, a glass material, and a non-polyolefin foam material, the non-polyolefin foam material contacting and substantially surrounding the fibrous material and the glass material, the fibrous material comprising at least one sheet of fibrous material to enhance bonding of the non-polyolefin foam material, the non-polyolefin foam material comprising a high density, high strength, and lightweight foam, and the high density being in a range of about 18 pounds per cubic foot to about 28 pounds per cubic foot.

27. A foam sheet as defined in claim 26, wherein the fibrous material comprises at least one of the following: a synthetic fiber, a natural fiber, animal hair, scrap carpet material, a screen material, a metal shaving material, a plastic particulate material, and a glass particulate material.

28. A foam sheet as defined in claim 26, wherein the glass material is selected from the group consisting of a sheet of woven glass and a sheet of non-woven glass.

29. A foam sheet as defined in claim 26, wherein the non-polyolefin foam material comprises urethane.

30. A foam sheet having enhanced fastener retention so that when a fastener, having threaded portions is positioned within the foam sheet, the fastener is not easily removed from the foam sheet when an outward force is applied thereto, the foam sheet having a fastener torque test result in the range of about 20 inch-pounds to about 45 inch-pounds, the foam sheet comprising: a fibrous material, a glass material, and a non-polyolefin foam material, the non-polyolefin foam material contacting and substantially surrounding the fibrous material and the glass material, the fibrous material comprising at least one sheet of fibrous material to enhance bonding of the non-polyolefin foam material, the non-polyolefin foam material comprising a high density, high strength, and lightweight foam, and the foam sheet having a density in the range of about 20 pounds per cubic foot to about 30 pounds per cubic foot.

* * * * *